US006575088B2

(12) United States Patent

Finkler

(10) Patent No.: US 6,575,088 B2
(45) Date of Patent: Jun. 10, 2003

(54) PRESS LOCK

(76) Inventor: Charles J. Finkler, 23600 Dewey, Howard City, MI (US) 49329

( * ) Notice: Subject to any disclaimer, the term of this patent is extended or adjusted under 35 U.S.C. 154(b) by 19 days.

(21) Appl. No.: 09/770,726

(22) Filed: Jan. 26, 2001

(65) Prior Publication Data

US 2001/0032553 A1 Oct. 25, 2001

Related U.S. Application Data

(60) Provisional application No. 60/178,439, filed on Jan. 27, 2000.

(51) Int. Cl.[7] .................................................. F16P 7/00

(52) U.S. Cl. ......................... 100/342; 100/214; 72/441; 192/144

(58) Field of Search ................................ 100/341, 342, 100/347, 353, 219; 192/144; 72/441, 444

(56) References Cited

U.S. PATENT DOCUMENTS 2,198,767 A * 4/1940 Glasner ...................... 192/144
5,033,342 A * 7/1991 Nordlof ...................... 226/138
5,513,561 A * 5/1996 Biliskov et al. ............ 100/282

* cited by examiner

*Primary Examiner*—Allen Ostrager
*Assistant Examiner*—Shelley Self

(57) ABSTRACT

A press with a press lock includes a press frame, a press ram slidably connected with the press frame, a rack fixedly connected with the frame, a pinion block connected with the ram, a pinion actuator operatively interconnected between the ram and the pinion block, and a control operatively connected with the pinion actuator. The press frame defines a stroke length and the press ram slides along the stroke length. The rack also extends along the stroke length, and the pinion block slides generally perpendicular to the stroke length, between open and closed positions of the press lock. The pinion block is also substantially fixed with the ram, relative to movement in a direction along the stroke length. The pinion block further engages the rack in the closed position, fixing the ram at a predetermined location along the stroke length, and disengages the rack in the open position, not inhibiting sliding of the ram along the stroke length. Finally, the pinion actuator slides the pinion block between the open and closed positions.

15 Claims, 5 Drawing Sheets

PRESS LOCK

CROSS-REFERENCES TO RELATED APPLICATIONS

This is a continuing application of co-pending U.S. Non-provisional Patent Application Ser. No. 60/178,439, entitled Press Lock and filed on Jan. 27, 2000, by Charles J. Finkler, now co-pending, the disclosure of which is incorporated here by reference.

STATEMENT REGARDING FEDERALLY SPONSORED RESEARCH OR DEVELOPMENT

Not Applicable.

BACKGROUND OF THE INVENTION

The invention relates to powered presses. More specifically, the invention is a lock that is useful to improve safe operation and maintenance of powered presses, such as pneumatic and hydraulic presses, which are commonly used in manufacturing stamped parts and the like.

Many components or parts of assembled products are stamped in a press die from stock material. Corresponding die halves are mounted in the press and used to cut or shape or otherwise form components. One die half is mounted on a bed of the press while a mating die half is mounted on a traveling ram. The ram strokes back and forth, opening and closing the die. The ram stroke is commonly, though not always, oriented generally vertically.

The one die half remains stationary on the press bed and the mating die half travels with the ram. The mating die half is pulled away from the one die half when the ram strokes back to the open position. A selected piece of material is positioned over the one die half and the mating die half is pressed to the one die half when the ram strokes forth to the closed position, conforming the material to the die.

From time to time, the press is opened for access to the die halves. This may be for any number of reasons, including maintenance, repair, or changing of the die halves, for example. It is inherent in the design of a press that it is constructed to close the die halves together with great force. Thus, some auxiliary or accessory device is required to hold the die halves open. Perhaps the simplest and most common method of holding a press open is merely blocking the ram open by interposing an obstruction, such as a jack or blocking, for example, between the press bed and ram. This is neither efficient or certain to be used, however. One having even a passing knowledge of presses will understand the danger to an operator if the operator reaches between the die halves when the press is not positively locked in the open position.

BRIEF SUMMARY OF THE INVENTION

Accordingly, a press with a press lock of the invention includes a press frame, a press ram slidably connected with the press frame, a rack fixedly connected with the frame, a pinion block connected with the ram, a pinion actuator operatively interconnected between the ram and the pinion block, and a control operatively connected with the pinion actuator. The press frame defines a stroke length and the press ram slides along the stroke length. The rack also extends along the stroke length, and the pinion block slides generally perpendicular to the stroke length, between open and closed positions of the press lock. The pinion block is also substantially fixed with the ram, relative to movement in a direction along the stroke length. The pinion block further engages the rack in the closed position, fixing the ram at a predetermined location along the stroke length, and disengages the rack in the open position, not inhibiting sliding of the ram along the stroke length. Finally, the pinion actuator slides the pinion block between the open and closed positions.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 1:
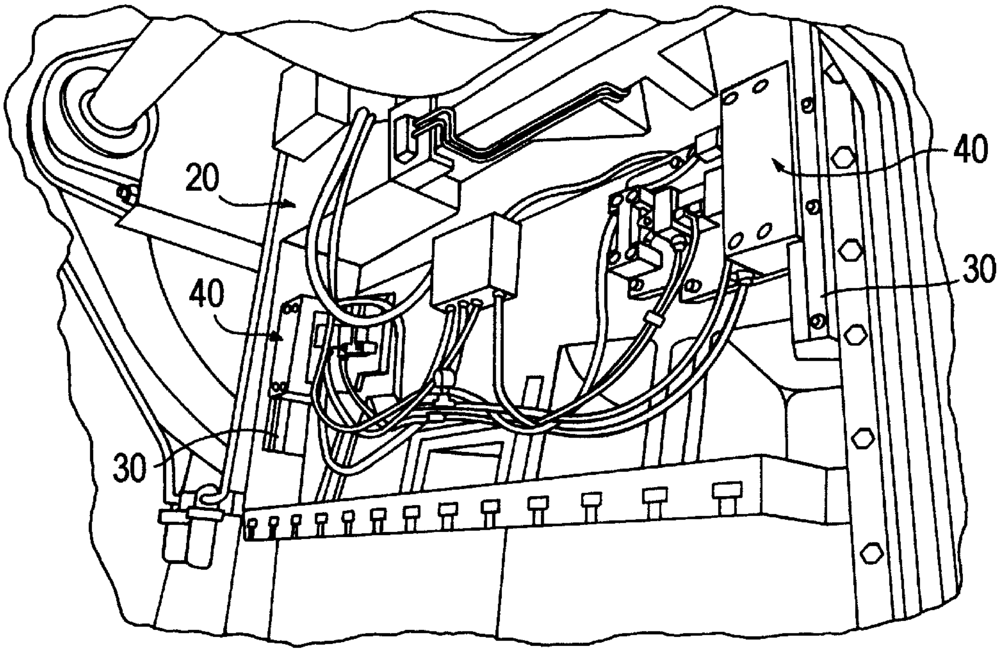
FIG. 1 is a fragmentary lower perspective view of a press, showing a press lock according to the invention.

A press lock of the invention is most preferably used with a press that has a press frame 20 and a press ram 22. The frame 20 defines a stroke length and the ram 22 cycles back and forth along the stroke length. The press lock has a lock rack 30, a pinion block 32, a pinion actuator 34, and a lock control.

Figure 2:
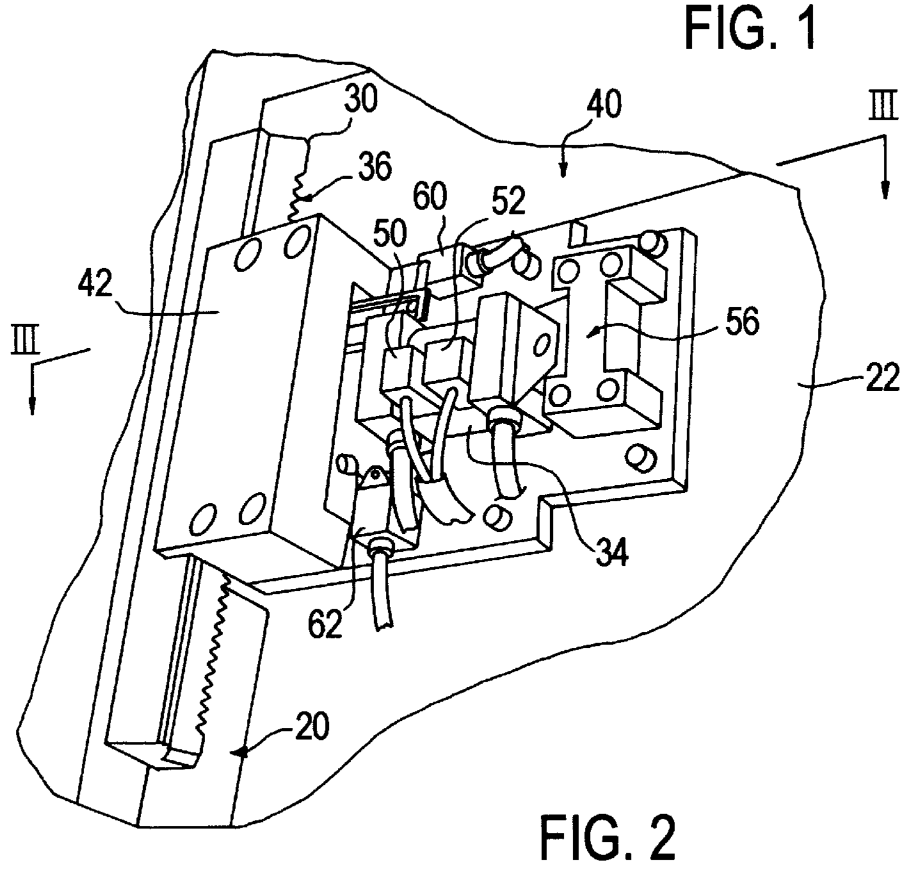
FIG. 2 is a fragmentary enlarged detail of a left lock assembly of FIG. 1.
Figure 3:
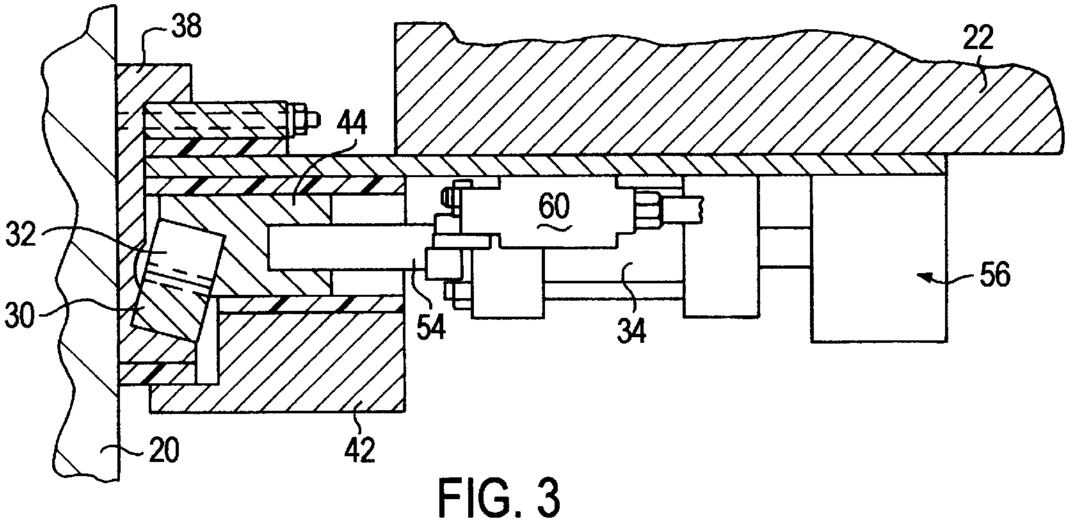
FIG. 3 is a fragmentary partial cross-sectional view along line III—III of FIG. 2, showing the lock assembly closed.
Figure 4:
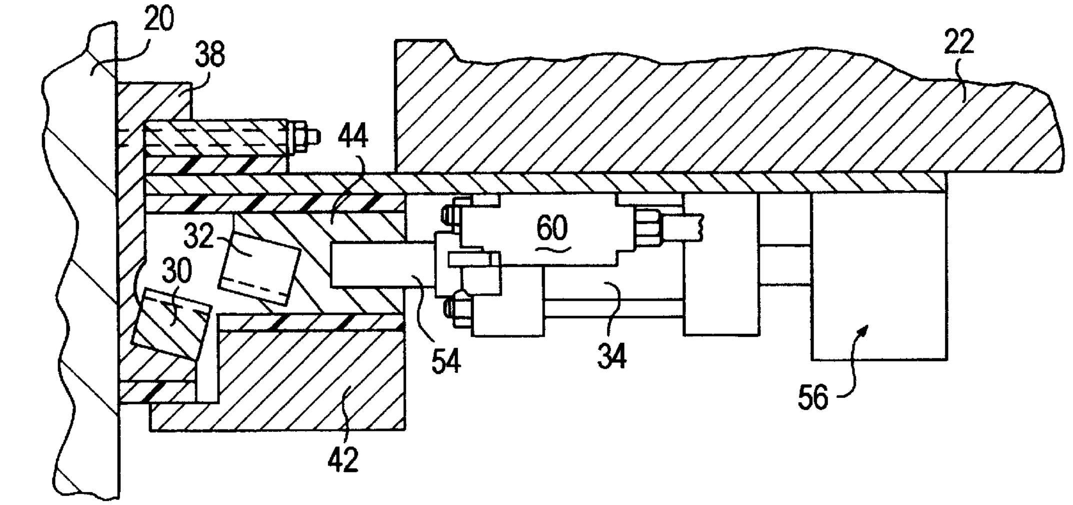
FIG. 4 is the view of FIG. 3, showing the lock assembly open.
Figure 7:
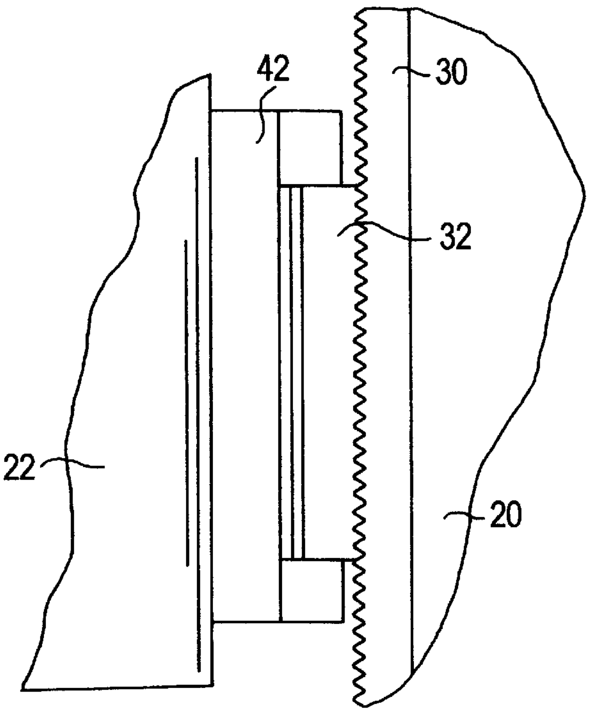
FIG. 7 is a fragmentary elevational view of the pinion block engaging the rack.

The lock rack 30 is preferably a generally linear array of teeth 36, and is fixed relative to the press frame 20 in an orientation that is generally parallel with the stroke length (FIGS. 1, 2, and 7). While the rack 30 may be directly attached to the frame 20, the rack is more preferably mounted to a rack base 38 that may be directly attached to the frame (FIGS. 3 and 4). In this way, the rack 30 may be removably mounted to the rack base 38, which may facilitate initial installation and subsequent maintenance and repair. One having ordinary skill in the art will understand that the rack base 38 is not subject to wear like the rack 30, which will be engaged by the pinion block 32, which may cause wear or other damage over time. Thus, the rack 30 is preferably made of a hardened material, such as AISI 1215 carbon steel, while the rack base 38 may be made of a more standard mild steel. The rack base 38 then provides strength and support to the rack 30, especially when mounted to the press frame 20, with a less expensive material that is more easily formed than a harder material, which is preferred for the rack.

More particularly the rack 30 may be a length of about 1.5 inch (38 mm) square stock with the teeth 36 formed with a

#8 pitch into one side, as is available from Browning Manufacturing Division of Emerson Electric Co., Maysville, Ky., as part 4YSR8X. The length of the rack 30 that is required will vary from installation to installation, depending upon the actual length of the press stroke. A formula for the length of the rack 30 would then be at least the stroke length plus the length of the pinion block 32. This length of rack will allow full length engagement of the pinion 32 with the rack 30 along the length of the press ram stroke.

The pinion 32 is substantially a corresponding short length of the rack material. A ten inch (254 mm) length of the pinion block 32 can provide a press lock holding strength of about twenty-two tons, for example, with only one lock assembly 40, which comprises one each of the rack 30, pinion block 32, and pinion actuator 34. The lock assemblies 40 are most preferably mounted in opposing pairs, however, as shown at the left and right sides in FIG. 1.

Figure 5:
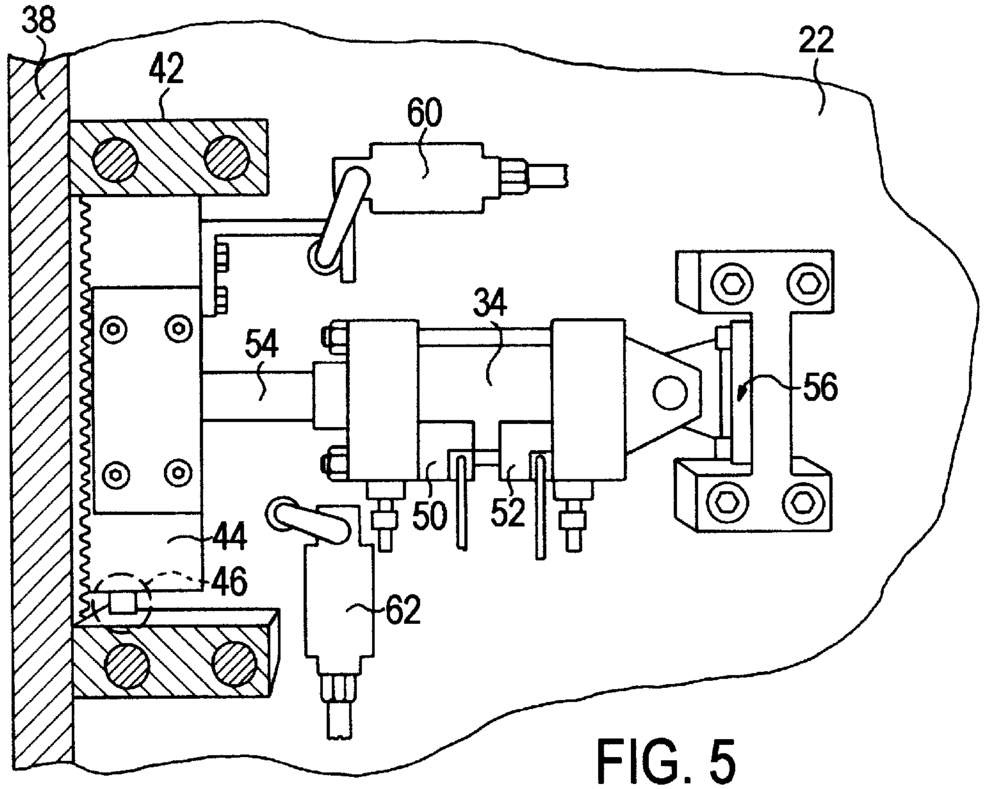
FIG. 5 is a fragmentary partial cross-sectional front elevational view of the left lock assembly, showing the lock assembly closed.

The pinion 32 is mounted on the ram 22, and so travels with the ram along the stroke path, and along the lock rack 30. The pinion 32 is oriented generally parallel with the rack 30 and slides generally perpendicular to the length of the rack and the stroke path. More specifically, the pinion 32 slides into engagement with the lock rack 30 in the lock closed position (FIGS. 3 and 5). The corresponding teeth 36 of the pinion 32 and the rack 30 register and mesh in the closed position, thereby preventing sliding of the pinion along the rack and in turn holding the ram 22 fixed relative to the press frame 20.

As with the rack 30, the pinion 32 is preferably mounted indirectly on the ram 22. A pinion block assembly includes the pinion actuator 34, a pinion guide 42, a pinion base 44, and the pinion 32 (FIGS. 3 and 4). The pinion guide 42 is a generally U-shaped open sided frame or housing member that defines a channel through which the pinion 32 slides (FIGS. 1 and 2). The pinion guide 42 fixes the pinion 32 from moving in a direction along the stroke path relative to the ram 22. Yet, the pinion guide 42 allows sliding of the pinion 32 into and out of engagement with the lock rack 30, in a direction generally perpendicular to the stroke path.

The pinion 32 does not slide through the guide by itself. Rather, the pinion 32 is supported and strengthened by mounting the pinion to the pinion base 44, like the rack 30, which is discussed in greater detail above. Thus, the pinion base 44 is easily formed from a standard, mild steel, while the pinion 32 is formed of a hardened carbon steel. The pinion 32 and the rack 30 are aligned with and oriented relative to one another for full engagement of their respective teeth 36 along the width of the teeth, in the closed lock position. During operation of the press, it is probable that the press will be stopped and the ram 22 will coast to a stop at a location along the stroke path where the respective teeth 36 of the pinion 32 and the lock rack 30 are not aligned where they will register and mesh one with the other.

Figure 6:
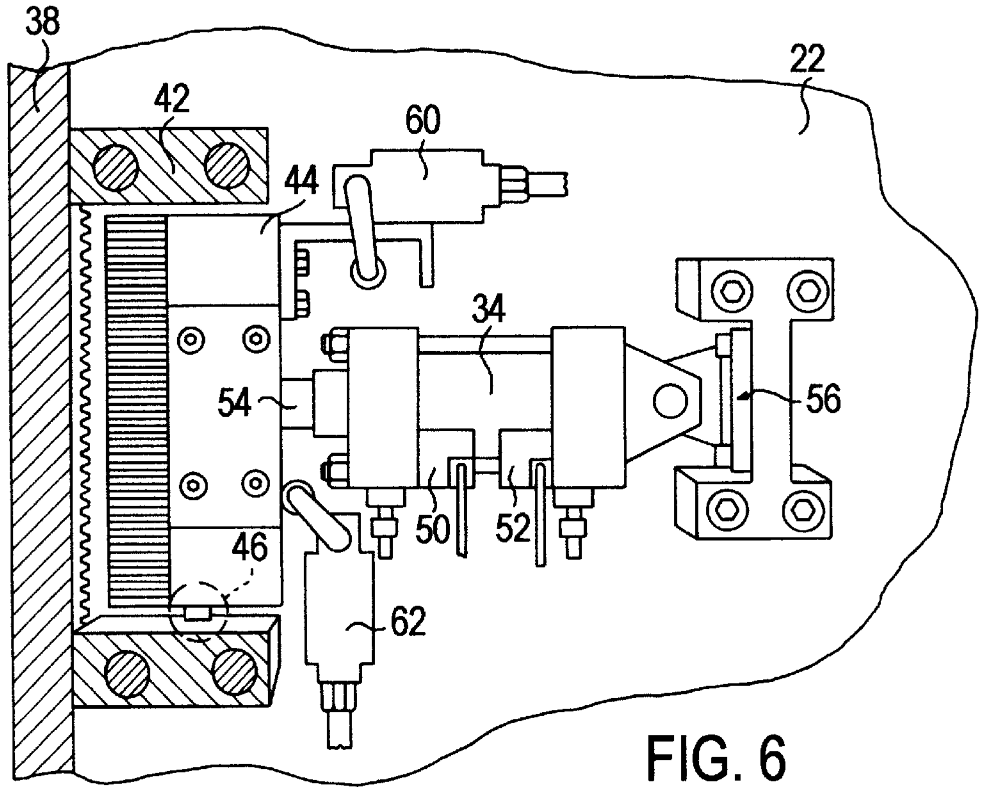
FIG. 6 is the view of FIG. 5, showing the lock assembly open.
Figure 9:
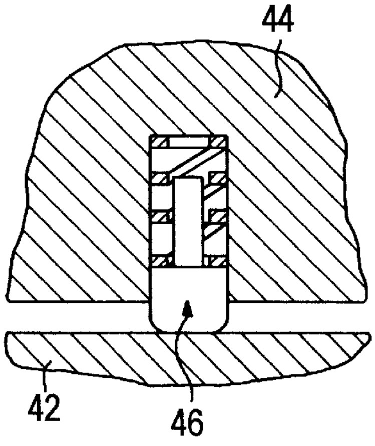
FIG. 9 is a fragmentary enlarged cross-sectional detail of a pinion block float pin.

Thus, some degree of float should be provided for one of the pinion 32 and the rack 30, preferably the pinion. The pinion 32 is, therefore, provided with extra clearance with the pinion guide 42 to float about half a tooth pitch along the length of the pinion and lock rack 30. A float pin and bias spring assembly 46 as is known to one having ordinary skill in the art, is also provided between the pinion 32 and the pinion base 44 for this purpose (FIGS. 5, 6, and 9).

Figure 8:
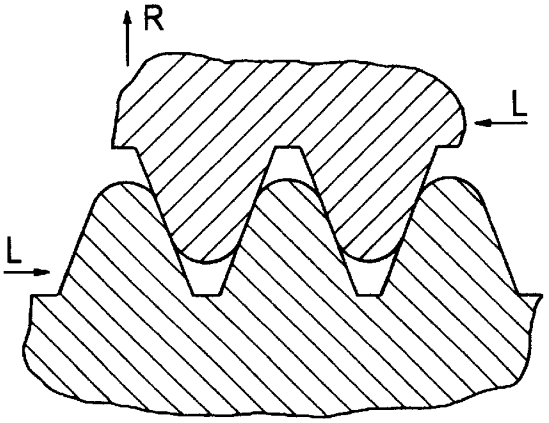
FIG. 8 is a fragmentary enlarged cross-sectional detail of the teeth of the pinion block and the rack engaging.

One having ordinary skill in the art will know that a load ‘L’ applied to the engaged pinion 32 and rack 30 in a direction along the lengths of the pinion and rack (FIG. 8), will create a force ‘R’ that is generally perpendicular to the toothed interface of the pinion and rack and that will act to disengage the pinion and the rack. Thus, the toothed interface of the pinion 32 and rack 30 is most preferably not generally perpendicular to the direction of the pinion sliding motion. Rather, the pinion 32 and rack 30 are rotated so the direction of the pinion sliding motion intersects the toothed interface of the pinion and rack at an angle of about ten to twenty degrees (FIGS. 3 and 4). This angle range minimizes the force required of the pinion actuator 34 to retain the pinion 32 in locked or closed engagement with the rack 30, without excessive required travel of the pinion between closed and open positions of the lock. Of course the angle may be increased with associated increase of the required retention force. The required retention force is reduced by about two thirds when the direction of the pinion sliding motion intersects the toothed interface of the pinion 32 and rack 30 at an angle of about ten to twenty degrees, however.

With the pinion 32 and rack 30 so rotated, the majority of the disengaging force ‘R’ is directed generally perpendicular to both of the direction of the pinion sliding motion and the direction of the press stroke. Thus, the pinion guide 42 is adapted to overlay not only the pinion 32 and the pinion base 44, but also the lock rack 30 and the rack base 38 (FIGS. 3 and 4). So constructed and securely fastened to the ram 22, the pinion guide 42 further holds the pinion 32 engaged with the lock rack 30 in the lock closed position.

The pinion actuator 34 is most preferably a double acting pneumatic cylinder, such as an about two inch (51 mm) diameter cylinder with an about three inch (76 mm) stroke, as is commonly available from Nogren (FIGS. 1–6). For complete actuation control, the cylinder 34 should be equipped with a pair of magnetic switches 50 and 52 or the like. The switch 50 at the front of the cylinder 34 indicates when the cylinder piston and rod 54 are extended. The switch 52 at the back of the cylinder 34 indicates when the cylinder piston and rod 54 are retracted. The pinion actuator cylinder 34 is pivotally connected between the ram 22 and the pinion 32 with a pivot mount 56 to the ram and a pivotable connection with the pinion base 44. With the flexibility of pivotally connecting the cylinder 34 between the ram 22 and the pinion 32, the pinion can be allowed to float a small distance to accommodate a situation when the pinion and the lock rack teeth 36 are aligned crown to crown and one, preferably the pinion, must move a distance of about half a tooth pitch in order to mesh the teeth together and engage the pinion with the rack 30.

The lock control includes the magnetic switches 50 and 52 on the cylinder 34, that indicate the extended or retracted condition of the cylinder piston and rod 54. Redundant micro switches 60 and 62 are also provided. While the micro switch 60 indicates when the pinion 32 is extended or engaged with the rack 30 in the lock closed position, the micro switch 62 indicates when the pinion 32 is withdrawn or disengaged from the rack 30 in the lock open position. Thus, not only is the cylinder position accounted for, but the pinion position is also accounted for. Further, a pneumatic pressure sensing switch is provided to assure adequate operating air pressure.

In operation, an operator will manipulate the standard press controls to start the press. The press lock control is operatively interconnected in sequence with the press control, so the press lock takes priority over the press operation. In the start sequence, the press is presumed stopped and the press lock closed. Thus, the pinion 32 is engaged with the lock rack 30, so the micro switch 60 is closed. Also, pinion actuator cylinder piston and rod 54 are in the locked or extended position, so the magnetic switch 50 is closed. The pneumatic pressure sensing switch will open or be open if air pressure is insufficient for operating the press lock and will generally preclude press start up. When air pressure is adequate, above eighty pounds per square inch, for example, then the pinion actuator cylinder 34 is activated to retract the piston and rod 54, withdrawing the pinion 32 from the lock rack 30. As the pinion 32 is pulled back from the rack 30, the micro switch 60 and the magnetic switch 50 open. The micro switch 62 and the magnetic switch 52 close when the lock opens with the pinion 32 and piston retracted, completing the standard press control circuit and allowing the press control circuit to proceed with start up in its normal course.

Figure 10:
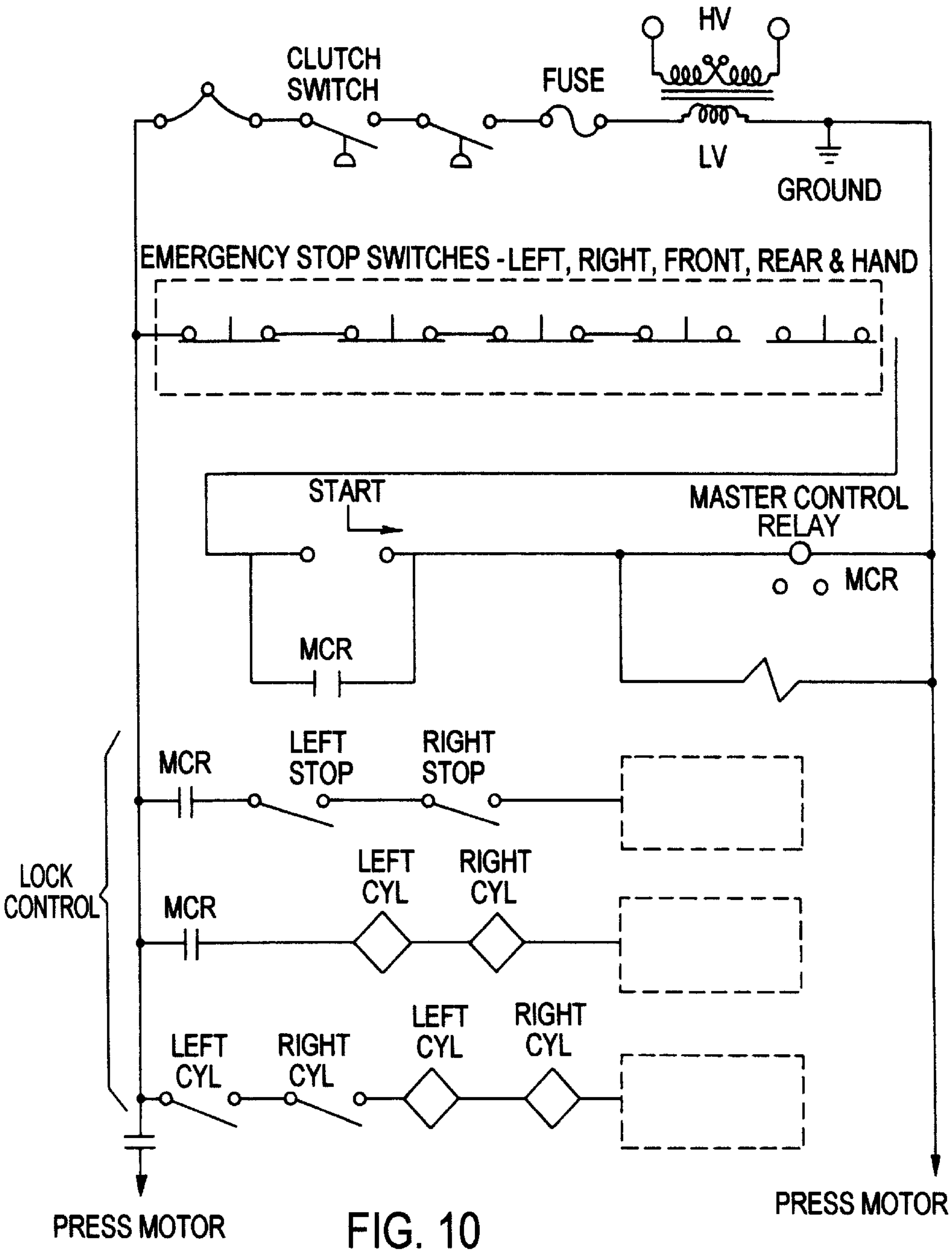
FIG. 10 is a schematic representation of an electrical control circuit of the invention.

The lock control is also preferably provided with a motion sensor (not shown) at the press fly wheel. One having ordinary skill in the art understands the use of a motion sensor in the master control relay circuit MCR of a press and an inherent connection between flywheel and ram movement. A known motion sensor is, therefore, not specifically detailed and shown in the drawing figures, and is included in the general identification of a master control relay circuit (FIG. 10) as being understood. In shut down, then, the press control circuit proceeds to stop the press in its normal course until the fly wheel stops and the motion sensor activates the lock control. The micro switch 62 and the magnetic switch 52 are still closed with the lock open and the pinion 32 and piston retracted. The pinion actuator cylinder 34 is activated to extend the piston and rod 54, extending the pinion 32 into engagement with the lock rack 30. As the pinion 32 is pressed into the rack 30, the micro switch 62 and the magnetic switch open 52 open, opening the standard press control circuit. The micro switch 60 and the magnetic switch 50 close when the lock closes with the piston and rod 54 extended and the pinion 32 engaging the lock rack 30. The standard press control circuit is interrupted by the lock control with the micro switch 62 and the magnetic switch 52 open, so the press should not start unintentionally.

It will be understood by one having ordinary skill in the art and by those who practice the invention, that various modifications and improvements may be made without departing from the spirit of the disclosed concept. Various indicators, including status lights may be provided at an operator's control panel, for example. Also, various relational terms, including left, right, front, back, top, and bottom, for example, may be used in the detailed description of the invention or in the claims only to convey relative positioning of various elements of the claimed invention. The scope of protection afforded is to be determined by the claims and by the breadth of interpretation allowed by law.

I claim:

1. The combination of a press and lock comprising:

a press frame, the press frame defining a stroke length;

a press ram, the press ram being slidably connected with the press frame, the ram sliding along the stroke length;

a rack, the rack being fixedly connected with the frame, the rack extending along the stroke length;

a pinion block, the pinion block being connected with the ram, the pinion block being substantially fixedly connected with the ram relative to movement in a direction along the stroke length, the pinion block sliding generally perpendicular to the stroke length between open and closed positions, the pinion block being engaged with the rack in the closed position and fixing the ram at a predetermined location along the stroke length, the pinion block being disengaged from the rack in the open position and not inhibiting travel of the ram along the stroke length;

a pinion actuator, the pinion actuator being operatively connected with each of the ram and the pinion block, the pinion actuator sliding the pinion block between the open and the closed positions; and a control, the control being operatively connected with the pinion actuator.

2. The combination of claim 1 wherein the rack has an array of receptacles and the pinion block has at least one cooperating projecting member, whereby the projecting member registers with and engages one of the receptacles in the closed position.

3. The combination of claim 2 wherein the array of receptacles is defined by a plurality of valleys between adjoining teeth of a series of teeth and wherein the at least one cooperating projecting member is defined by at least one corresponding tooth.

4. The combination of claim 2 wherein the array of receptacles is defined by a plurality of valleys between adjoining teeth of a series of teeth and wherein the at least one cooperating projecting member is defined by at least one corresponding tooth of a series of teeth.

5. The combination of claim 2 wherein the receptacles are evenly spaced along the rack, wherein the pinion block has a neutral position relative to movement of the pinion block along the stroke length relative to the ram, and wherein the pinion block floats up and down along the stroke length relative to the neutral position, a distance of about one half the spacing between adjoining receptacles.

6. The combination of claim 1 wherein the pinion actuator is one of a group that comprises pneumatic, hydraulic, and screw extensible cylinders.

7. The combination of claim 1 wherein the press has operational modes that include at least the optional modes of start, run, and stop, wherein the control is responsive to the operational modes of the press, wherein the control opens the lock responsive to the start mode, and wherein the control closes the lock responsive to the stop mode.

8. The combination of claim 1 wherein the press has operational modes that include at least the operational modes of start, run, and stop, wherein the control interacts with the operational modes of the press, wherein the control opens the lock responsive to the start mode and pauses transition of the press from the start mode to the run mode while the lock transitions from the closed to the open positions.

9. In a press that has a frame that defines a stroke length, a ram that slides along the stroke length relative to the frame, a press power source that is operatively connected with each of the frame and the ram, the press power source moving the ram along the stroke length, and a press control that is operatively connected with the press power source and that generates start and stop signals responsive to a user, the improvement of a press lock comprising:

a rack that is fixedly connected with the frame and that extends along the stroke length;

a bolt that is fixedly connected with the ram relative to movement along the stroke length and is slidably connected with the ram relative to movement generally perpendicular to the stroke length, the bolt sliding between extended and retracted positions, the bolt engaging the rack in the extended position and fixing the ram at a predetermined position along the stroke length, the bolt disengaging the rack in the retracted position a lock power source that moves the bolt between the extended and retracted positions; and a lock control that is operatively connected with and actuates the lock power source.

10. The press lock of claim 9, wherein the rack has a plurality of rack teeth, the bolt has at least one operating bolt tooth, and the bolt tooth engages the rack teeth when the bolt is in the extended position.

11. The press lock of claim 10, wherein the lock control is responsive to the press control, whereby the lock control actuates the lock power source and the lock power source retracts the bolt to the retracted position in response to a start signal of the press control, and whereby the lock control actuates the lock power source and the lock power source extends the bolt to the extended position in response to a stop signal of the press control.

12. The press lock of claim 11, wherein the lock control further includes a ram motion sensor, the ram motion sensor generating a first signal when the press ram is in motion, the ram motion sensor generating a second signal when the press ram is in a stopped condition, whereby the lock control actuates the lock power source and the lock power source extends the bolt to the extended position in response to a stop signal of the press control and the second signal of the ram motion sensor.

13. The press lock of claim 9, wherein the lock power source includes one of a group of actuators that comprises pneumatic, hydraulic, and screw extensible cylinders.

14. The press lock of claim 9, wherein the press has operational modes that include at least the operational modes of start, run, and stop, wherein the lock control is responsive to the operational modes of the press, wherein the lock control opens the lock responsive to the start mode, and wherein the control closes the lock responsive to the stop mode.

15. The combination of claim 9 wherein the rack has an array of receptacles and the bolt has at least one cooperating projecting member, wherein the projecting member registers with and engages one of the receptacles in the closed position, wherein the receptacles are evenly spaced along the rack, wherein the bolt has a neutral position relative to movement of the bolt along the stroke length relative to the ram, and wherein the bolt floats up and down along the stroke length relative to the neutral position, a distance of about one half the spacing between adjoining receptacles.

* * * * *